United States Patent [19]

Heynemann et al.

[11] Patent Number: 4,826,142

[45] Date of Patent: May 2, 1989

[54] BEARING FOR ELASTIC SUPPORT OF MACHINES

[75] Inventors: Carl Heynemann, Taufkirchen; Werner Hundt, Munich, both of Fed. Rep. of Germany

[73] Assignee: Metzeler Kautschuk GmbH, Munich, Fed. Rep. of Germany

[21] Appl. No.: 93,006

[22] Filed: Sep. 4, 1987

[30] Foreign Application Priority Data

Sep. 5, 1986 [DE] Fed. Rep. of Germany ....... 3630360

[51] Int. Cl.$^4$ ................................................ B60K 5/12
[52] U.S. Cl. .............................. 267/140.1; 267/141.4; 267/141.5; 267/153
[58] Field of Search ...................... 267/140.1, 292, 293, 267/294, 119, 140, 140.3, 141.1, 141.3, 141.4, 141.5, 153; 248/562, 636, 603, 609, 614, 632, 638, 659

[56] References Cited

U.S. PATENT DOCUMENTS

| | | | |
|---|---|---|---|
| 3,157,934 | 11/1964 | Williams | 267/292 |
| 4,183,496 | 1/1980 | Brock et al. | 267/141.4 |
| 4,522,378 | 6/1985 | Nelson | 267/292 |
| 4,645,188 | 2/1987 | Jordens | 267/140.1 |
| 4,657,232 | 4/1987 | West | 267/140.1 |

FOREIGN PATENT DOCUMENTS 0048306 4/1940 Netherlands ........................ 267/292

*Primary Examiner*—Andres Kashnikow
*Assistant Examiner*—Mark T. Le
*Attorney, Agent, or Firm*—Herbert L. Lerner; Laurence A. Greenberg

[57] ABSTRACT

A bearing for the elastic support of machines includes a rigid fiber-reinforced plastic frame having a primatic cross section and upper, lower and lateral frame walls. Rubber cushions are each vulcanized onto a respective one of the lateral walls and symmetrically disposed relative to each another. A carrier supports the rubber cushions. A retaining bolt for a machine passes through the upper frame wall. The retaining bolt has an enlarged base and an outer surface disposed in the frame. Plastic material uniformly coats the outer surface of the retaining bolt inside the frame. Vertical supporting walls supported on the enlarged base support the retaining bolt against forces tending to pull the retaining bolt out of the frame.

11 Claims, 2 Drawing Sheets

BEARING FOR ELASTIC SUPPORT OF MACHINES

The invention relates to a bearing or mount for the elastic support of machines, in particular motors, having a rigid frame with a prismatic cross section for receiving a retaining bolt for the machine bearing, as well as rubber cushions vulcanized symmetrically relative to one another on both sides of the frame, the cushions being supported on a carrier.

German Petty Parent No. DE-GM 1 973 202 discloses an elastic wedge bearing, which is constructed in accordance with this principle. In this kind of wedge bearing, the rigid frame is typically formed of metal, which although it has great strength and securely anchors the actual retaining bolt for the motor to be supported, is very heavy and furthermore can vibrate itself, which additionally causes undesirable vibrational superposition.

It is accordingly an object of the invention to provide a bearing for the elastic support of machines, which overcomes the hereinafore-mentioned disadvantages of the heretofore-known devices of this general type, which has a very low weight, that is not vulnerable to corrosion, that nevertheless has optimal strength, even with respect to anchoring the retaining bolt and that permits flexurally rigid transmission of the induced forces to the rubber cushions.

With the foregoing and other objects in view there is provided, in accordance with the invention, a bearing for the elastic support of machines, especially motors, comprising a rigid fiber-reinforced plastic frame having a prismatic cross section and upper, lower and lateral frame walls, rubber cushions each being vulcanized onto a respective one of the lateral walls and symmetrically disposed relative to each another, a carrier supporting the rubber cushions, a retaining bolt for a machine passing through the upper frame wall, the retaining bolt having an enlarged or widened base and an outer surface disposed in the frame, plastic material uniformly coating the outer surface of the retaining bolt inside the frame, and vertical supporting walls supported on the enlarged base and supporting the retaining bolt against forces tending to pull the retaining bolt out of the frame.

In a bearing constructed in this way, the frame has a very low weight, yet has adequate strength for the transmission of the forces that arise. Since the bolt is anchored by the plastic and because of the walls supporting the enlarged base, so much resistance is presented to pulling out the bolt that complete detachment of the bolt from the bearing is reliably avoided. Furthermore, the heat flux from the motor support to the supporting rubber cushions is considerably reduced, which has a positive effect on the service life.

In accordance with another feature of the invention, the supporting walls are formed by the lateral walls of the prismatic frame.

In accordance with a further feature of the invention, the plastic material and the frame define a free cross section therebetween, and the supporting walls are in the form of ribs extending radially from the plastic material disposed on the bolt and filling the free cross section.

In accordance with an added feature of the invention, the frame has an upper surface, and there is provided a disk-shaped metal support disposed on the bolt and embedded in the plastic material level with the upper surface of the frame.

In accordance with an additional feature of the invention, the disk-shaped support has a non-circular periphery. The disk-like support may have a toothed or polygonal periphery, so as to permit it to serve at the same time as means for the prevention of rotation.

In accordance with yet another feature of the invention, the base of the bolt has a lower surface with recesses formed therein anchoring the bolt in the plastic material. This structure provides additional protection against twisting.

In accordance with yet a further feature of the invention, the frame has a trapezoidal cross section.

In accordance with yet an added feature of the invention, the frame has a triangular cross section with a downwardly pointing apex. In such a case, the two side legs of the triangle at the same time serve to support the enlarged base of the bolt.

In accordance with yet an additional feature of the invention, the enlarged base of the bolt at least partially penetrates the planes of the lateral walls of the frame at given locations, and the lateral walls have corresponding bulges at the given locations.

In accordance with still another feature of the invention, the plastic frame is formed of fiber-reinforced polyamide.

In accordance with a concomitant feature of the invention, the supporting walls are in the form of ribs extending radially from the plastic material disposed on the bolt, and the frame with the embedded bolt and the ribs are in the form of a one-piece plastic part. This structure is provided in a primary forming process specific to plastic.

Other features which are considered as characteristic for the invention are set forth in the appended claims.

Although the invention is illustrated and described herein as embodied in a bearing for the elastic support of machines, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

FIG. 6 is a top-plan view of FIG. 3.

Figure 1:
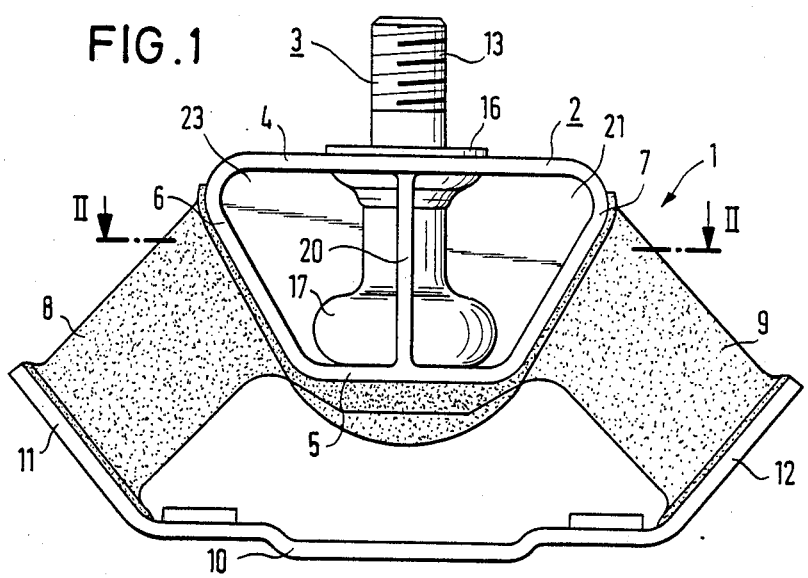
FIG. 1 is a side-elevational view of a bearing according to the invention.
Figure 2:
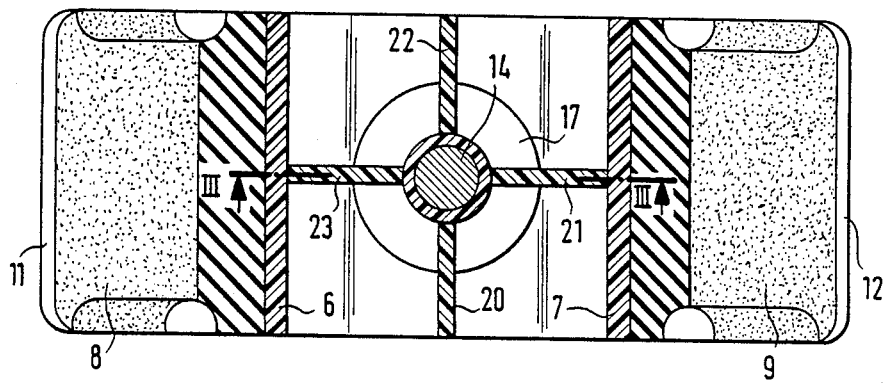
FIG. 2 is a cross-sectional view of the bearing taken along the line II—II of FIG. 1 in the direction of the arrows.
Figure 3:
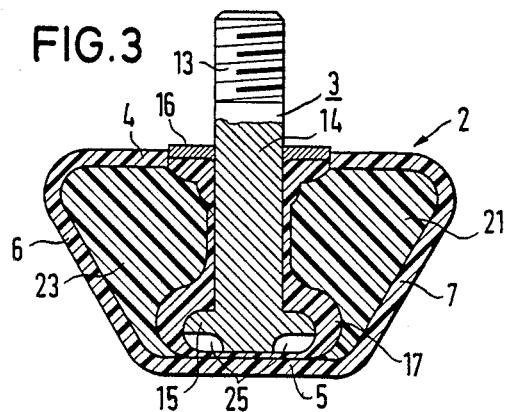
FIG. 3 is a vertical-sectional taken only through the trapezoidal frame of the bearing along the line III—III of FIG. 2 in the direction of the arrows.

Referring now to the figures of the drawings in detail and first, particularly, to the embodiment shown in FIGS. 1–3 thereof, there is seen a bearing having a trapezoidal frame. It will be understood, however, that the frame may also have any other prismatic cross section, because even with other shapes, it is still constructed on the same basic principle.

As shown first in FIG. 1, there is seen a bearing or support 1 having a trapezoidal frame 2, which is practically in the form of a bearing block, for receiving and retaining a bearing or retaining bolt 3, on which a non-illustrated motor is supported. The frame 2 is formed of an upper frame surface or wall 4, a lower frame surface or wall 5 and two lateral surfaces or walls 6 and 7 that are inclined at an angle. Two rubber cushions 8 and 9 are adhesively joined or bonded or vulcanized to the lateral surfaces 6 and 7 and protrude obliquely downward. The rubber cushions 8 and 9 are in turn supported by a flange or carrier 10 having ends 11 and 12 bent approximately in the shape of a V.

The frame 2 is formed of glass-fiber-reinforced plastic having a relatively high temperature resistance. Polyamide is a particularly suitable plastic material. However, polycarbonate or linear polyester can also be used, but good bonding to the rubber must be assured.

The bearing bolt or stud 3 which is formed of metal is located at the top of the frame 2 and has a threaded head 13, a cylindrical middle portion 14 and a spherically thickened base portion 15. The bolt 3 is provided with a disk-shaped support 16 at the level of the upper frame surface 4, serving as the actual support plate for the motor. The support 16 must protrude slightly beyond the upper frame surface 4. It is suitable for the outer periphery of the support 16 to be toothed or polygonal as shown in FIG. 6, so as to serve at the same time as anti-twisting means and also to optionally to make it easier to visually recognize whether or not twisting has occurred.

The region of the bolt 3 located inside the frame 2 is surrounded on all sides with plastic material 17, resulting in the outer contour of the bolt 3 shown particularly clearly in FIG. 1. The bolt base 15 suitably has a diameter which is larger than the upper support 16 and thus larger than the corresponding opening in the upper frame surface 4. It is thereby assured, firstly, in the event of a possible tearing out of the bolt 3, that the movement of the bolt will at least be retarded and retained by the upper frame surface 4. Secondly, in order to provide further support against forces pulling the bolt out and against shearing forces, the bolt 3 and in particular its base portion 15, 17 is retained and supported by means of radial ribs or walls 20, 21, 22 and 23. The ribs originate at the outer walls of the plastic material 17, extend as far as the lateral trapezoidal surfaces 6 and 7 and also extend from the level of the upper frame surface 4 as far as the lower frame surface 5, as shown particularly in FIG. 2. Thus the bolt 3 is additionally supported against forces that would tear it out, or shearing forces. Should these forces pulling it out nevertheless exceed a certain force, then the ribs 20-23 are first compressed, thus dissipating some of the incident energy. In the extreme case, however, the base 15 will strike the upper frame surface and be retained there, thereby considerably reducing the danger of detachment of the motor from the supports thereof.

In order to additionally prevent twisting of the bolt 3, the bolt has groove-like recesses 25 formed in the lower surface of the enlarged base 15, which are filled with plastic material (which has not been shown in the drawings for the sake of simplicity), in order to provide further retention of the bolt 3.

Figure 4:
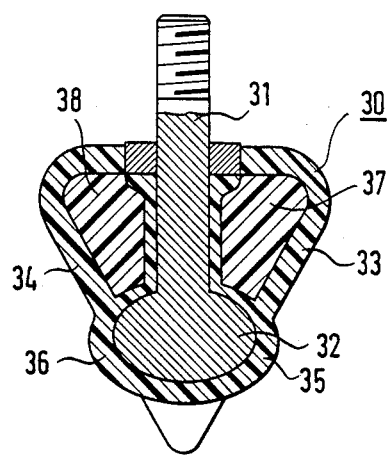
FIG. 4 is a view similar to FIG. 3 taken through a bearing having a triangular frame.
Figure 5:
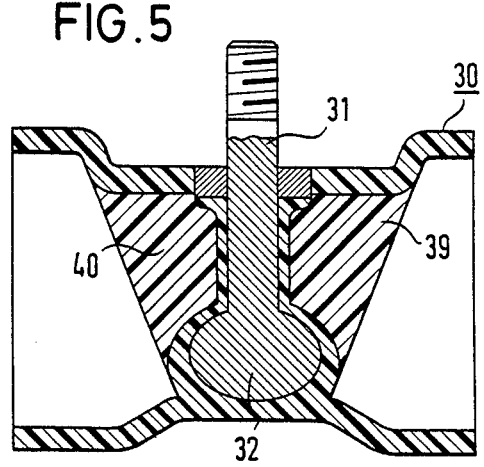
FIG. 5 is a longitudinal-sectional view taken through a bearing corresponding to FIG. 4

In another embodiment of such a frame which is shown in FIGS. 4 and 5, a frame 30 has a triangular cross section, with the apex pointing downward. In this frame, a bolt 31 having a spherically enlarged base 32 is inserted in the same manner, but the base 32 has an outside diameter which is large enough to cause it to intersect lateral walls 33 and 34 of the frame 30 that taper obliquely downward. In other words, this means that in the vicinity of the bolt base 32, the lateral walls 33 and 34 are supported directly on the base 32, thus securing the bolt 31 from being torn out. The walls 33 and 34 have corresponding bulges 35 and 36 at these points, so that once again the bolt base 32 is surrounded on all sides by the plastic material forming the frame 30. Additionally, corresponding transverse ribs 37 and 38 are once again provided, which fill up the free cross section of the frame 30. As seen in FIG. 5, additional ribs 40 and 39 are provided in the longitudinal direction, which are also supported on the base 32.

The frame with the enveloping of the bolt and the radial ribs are preferably made in one operation in a primary forming process, for example as an injection molded part, so that a unitary, stable and homogenous structural part is produced.

It should be noted in this respect that the different shadings in FIGS. 2 and 3 have been selected only in order to better identify the individual functional parts and to distinguish between them. In actuality, the part is a homogenously injected part of a unitary material having unitary strength without dividing seams or separate connecting materials in the functional boundary areas.

Since the part is manufactured from plastic, the weight of the bearing as a whole can be reduced considerably. Corrosion in the vicinity of the frame is also virtually precluded. Due to the low thermal conduction of the plastic, the rubber cushions and the adhering surfaces thereof are also only subjected to a lower temperature, which considerably increases the durability thereof.

The foregoing is a description corresponding in substance to German Application No. P 36 30 360.7, dated Sept. 5, 1986, the International priority of which is being claimed for the instant application, and which is hereby made part of this application. Any material discrepancies between the foregoing specification and the aforementioned corresponding German application are to be resolved in favor of the latter.

We claim:

1. Bearing for the elastic support of machines, comprising a rigid fiber-reinforced plastic frame having a prismatic open cross section and upper, lower and lateral frame walls, rubber cushions each being vulcanized onto a respective one of said lateral walls and symmetrically disposed relative to each another, a carrier supporting said rubber cushions, a retaining bolt for a machine passing through said upper frame wall, said retaining bolt having an enlarged base and an outer surface disposed in said frame, plastic material uniformly coating said outer surface of said retaining bolt inside said frame, and vertical supporting walls supported on said enlarged base and supporting said retaining bolt against forces tending to pull said retaining bolt out of said frame.

2. Bearing according to claim 1, wherein said supporting walls are integral with said prismatic frame.

3. Bearing according to claim 1, wherein said plastic material and said frame define a free cross section therebetween, and said supporting walls are in the form of ribs extending radially from said plastic material disposed on said bolt and spanning said free cross section.

4. Bearing according to claim 1, wherein said frame has an upper surface, and including a disk-shaped metal support disposed on said bolt and embedded in said plastic material level with said upper surface of said frame.

5. Bearing according to claim 4, wherein said disk-shaped support has a non-circular periphery.

6. Bearing according to claim 1, wherein said base of said bolt has a lower surface with recesses formed therein anchoring said bolt in said plastic material.

7. Bearing according to claim 1, wherein said frame has a trapezoidal cross section.

8. Bearing according to claim 1, wherein said frame has a triangular cross section with a downwardly pointing apex.

9. Bearing according to claim 8, wherein said enlarged base of said bolt at least partially penetrates the planes of said lateral walls of said frame at given locations, and said lateral walls have corresponding bulges at said given locations.

10. Bearing according to claim 1, wherein said plastic frame is formed of fiber-reinforced polyamide.

11. Bearing according to claim 1, wherein said supporting walls are in the form of ribs extending radially from said plastic material disposed on said bolts, and said frame with said plastic material and said ribs are in the form of a one-piece plastic part.

* * * * *